US007031731B2

(12) United States Patent
Gau et al.

(10) Patent No.: US 7,031,731 B2
(45) Date of Patent: Apr. 18, 2006

(54) METHODS AND SYSTEMS FOR CONCURRENT PAGING OF MOBILE USERS IN CELLULAR NETWORKS

(75) Inventors: Rung-Hung Gau, Pan Chiao (TW); Zygmunt J. Haas, Summit, NJ (US)

(73) Assignee: Cornell Research Foundation, Inc., Ithaca, NY (US)

( * ) Notice: Subject to any disclaimer, the term of this patent is extended or adjusted under 35 U.S.C. 154(b) by 293 days.

(21) Appl. No.: 10/324,224

(22) Filed: Dec. 20, 2002

(65) Prior Publication Data

US 2003/0134649 A1 Jul. 17, 2003

Related U.S. Application Data

(60) Provisional application No. 60/344,286, filed on Dec. 27, 2001.

(51) Int. Cl.
*H04Q 7/20* (2006.01)
(52) U.S. Cl. ...................................... 455/458; 455/459
(58) Field of Classification Search ............... 455/458, 455/459, 503, 450, 456.1, 428, 434; 370/337
See application file for complete search history.

(56) References Cited

U.S. PATENT DOCUMENTS

| 5,875,400 A | 2/1999 | Madhavapeddy et al. ... 455/458 |
| 6,138,025 A | 10/2000 | Lee et al. .................... 455/453 |
| 6,181,945 B1 | 1/2001 | Lee ............................. 455/458 |
| 6,532,224 B1 * | 3/2003 | Dailey ........................ 370/337 |

OTHER PUBLICATIONS

Amiya Bhattacharya and Sajal K. Das, "LeZi-Update: An Information-Theoretic Approach to Track Mobile Users in PCS Networks", MOBICOM 1999, pp. 1-12.
C. Rose and R. Yates, "Minimizing the average cost of paging under delay constraints", Wireless Networks, 2(2):109-116, Jun. 1996.

(Continued)

*Primary Examiner*—George Eng
*Assistant Examiner*—Wesley Kim
(74) *Attorney, Agent, or Firm*—Burns & Levinson LLP; Jacob N. Erlich; Orlando Lopez

(57) ABSTRACT

Methods for concurrent paging, in a cellular system having a number of users, where the users are paged to determine a location of each user, are disclosed. The paging from one cell to one of the users occurs within one of a number of time slots. The time slot in which one of the users is paged from one of the cells is a characteristic of that cell and that user. An array encompassing the totality of the characteristics time slots constitutes a search schedule. One method comprises minimizing a characteristic function of paging performance, the function depending on the search schedule and the probability of finding a user in a cell, and, determining, from the minimization of the characteristic function, the search schedule. Two other methods for determining a search schedule, which are more computationally efficient and which reduce the paging cost, the simple heuristic and the conditional probability heuristic, are disclosed.

32 Claims, 7 Drawing Sheets

OTHER PUBLICATIONS

Krishnamachari, Gau, Wicker, and Haas (Bhaskar Krishnamachari, Rung-Hung Gau, Stephen B. Wicker, Zygmunt J. Haas), "On the performance of sequential paging for mobile user location", IEEE Vehicular Technoloogy Conference, Fall 2001.

D. Goodman, P. Krishnan, B. Sugla, "Minimizing queuing delays and number of messages in mobile phone location", Mobile Networks and Applications, vol. 1, p. 39-48, 1996.

C. Rose and R. Yates, "Ensemble polling strategies for increased paging capacity in mobile communications networks", ACM Wireless Networks, vol. 3, No. 2, p. 159-167, 1997, see also http://citeseer.nj.nec.com/rose96ensemble.html.

U.S. Provisional Appl. No. 60,344,286, filed Dec. 27, 2001. Title: Concurrent Search of Mobile Users in Cellular Networks. Applicants: Rung-Hung Gau et al.

* cited by examiner

METHODS AND SYSTEMS FOR CONCURRENT PAGING OF MOBILE USERS IN CELLULAR NETWORKS

CROSS REFERENCE TO RELATED APPLICATIONS

This application claims priority of U.S. Provisional Application No. 60/344,286, "Concurrent Search of Mobile Users in Cellular Networks", filed on Dec. 27, 2001, which is incorporated by reference herein.

BACKGROUND OF THE INVENTION

This invention relates generally to wireless cellular networks, and, more particularly, to methods for finding the current cell of a wireless cellular network in which a user resides.

In a cellular network, when a call to the mobile user arrives, a mobility management scheme is responsible for finding the current cell in which a mobile user resides. Typically, a mobility management scheme constitutes of a location update scheme and a paging scheme.

Over the last several years, the worldwide cellular communications market has experienced explosive growth. This growth has been driven by the decrease in prices of cellular service and phones and improved service. In general, as the number of subscribers increases for a fixed radio spectrum allocation, the size of wireless coverage cells must decrease, in order to accommodate the higher subscriber densities. As cells decrease in size, the problem of efficient location management becomes more difficult due to the additional signaling created by more subscribers and more cells. The additional signaling uses electromagnetic spectrum bandwidth, a scarce resource.

In the last decade, many location update schemes were proposed. Basically, these schemes were either movement-based, timer-based, distance-based, profile-based, state-based, or velocity-based. Schemes that use a hybrid of the above strategies were also proposed. It has been proven that distance-based schemes achieve better performance compared to movement-based schemes and timer-based schemes. Some proposed schemes suggested that a mobile user should register its location only when it enters some predefined cells, referred to as reporting centers. An information theoretic approach for location update and derivation of probabilistic information about locations of mobile users has been proposed (Amiya Bhattacharya and Sajal K. Das, "LeZi-Update: An Information-Theoretic Approach to Track Mobile Users in PCS Networks", MOBICOM 1999. Pages 1–12).

A location area is composed of a number of cells. Some researchers assumed that a mobile user sends a location update message to the system whenever it enters a new location area and concentrated on the design of an optimal location area. Kim and Lee proposed an integer-programming model to find the optimal location area, which may take on an irregular shape. Other researchers assumed that location areas are given and focused on the decision problem of whether a mobile user should send a location update message when it enters a new location area.

Recently, a convex optimization problem was formulated to minimize the costs of location update and paging in the movement-based location update scheme (Jie Li, Hisao Kameda, and Keqin Li, "Optimal dynamic mobility management for PCS networks", IEEE/ACM Transactions on Networking, vol. 8, no. 3 p. 319–27, June 2000.). A continuous formulation of the problem of one-dimensional location area design has been proposed to overcome the computational difficulty associated with the original combinatorial formulation. An improved probabilistic location update scheme has been proposed. Probabilistic paging has also been used for contention-free mobility management (Wing Ho A. Yuen and Wing Shing Wong, "A contention-free mobility management scheme based on probabilistic paging", IEEE Transactions on Vehicular Technology, vol. 50, no. 1, p. 48–58, January 2001).

There is an intrinsic tradeoff between location update and paging. As the frequency of location update increases, the location uncertainty decreases and therefore the paging cost decreases. And on the contrary, when the frequency of location update decreases, both the location uncertainty and paging cost increase. It is possible to see paging as a more fundamental operation than location update. However, as it has been pointed out, "the majority of the research on location management has actually focused on update schemes, assuming some obvious version of the paging algorithm."

The concept of dividing a location area into paging zones has been previously described. Lyberopoulos (G. L. Lyberopoulos, J. G. Markoulidakis, D. V. Polymeros, D. F. Tsirkas and E. D. Sykas, "Intelligent paging strategies for third generation mobile telecommunication systems", IEEE Transactions on Vehicular Technology, vol. 44, no. 3, p. 543–553, August 1995) proposed to page the cell that a mobile user registered with most recently and then page all other cells in the location area if necessary. Rose and Yates (C. Rose and R. Yates, "Minimizing the average cost of paging and registration: A timer-based method", Wireless Networks, 2(2):109–116, June 1996) proved that given the probabilistic information about the position of a mobile user, to minimize the average paging cost, the cells with the higher probabilities must be paged before the cells with the lower probabilities are paged. Krishnamachari, Gau, Wicker, and Haas (Bhaskar Krishnamachari, Rung-Hung Gau, Stephen B. Wicker, Zygmunt J. Haas, "Optimal Sequential Paging in Cellular Networks", IEEE Vehicular Technology Conference, Fall 2001) proposed an efficient algorithm to solve the problem of minimizing the average paging cost under the worst-case paging delay constraint.

All the above works on paging focused on the problem of searching for a single mobile user and assumed that some straightforward strategy of searching for multiple mobile users, such as sequential search, is used.

Rose et al.(C. Rose and R. Yates, "Minimizing the average cost of paging and registration: A timer-based method", Wireless Networks, 2(2):109–116, June 1996) proposed a sequential paging scheme to locate a single mobile user in the cellular network based on the probabilistic information of the location of the mobile user. The basic idea of such a system resides in partitioning cells in the network into a number of paging zones and search for paging zones one by one. More precisely, the system pages the first paging zone in the first time slot. If the mobile user is in the first paging zone, the mobile user is located and the search is aborted. Otherwise, the system pages the second paging zone, and so on.

In U.S. Pat. No. 6,181,945 (Jan. 30, 2001), Lee discloses a method for paging a single user based on minimizing the paging cost.

All the above described work focuses on the problem of searching for a single mobile user. However, it is more efficient for a multi-user system to service many paging requests simultaneously (or concurrently). A model has been proposed for the concurrent paging problem but it makes assumptions about the arrival times and/or the resident times of mobile users (D. Goodman, P. Krishnan, B. Sugla, "Minimizing queuing delays and number of messages in mobile phone location", Mobile Networks and Applications, Vol. 1, p. 39–48, 1996; C. Rose and R. Yates, "Ensemble polling strategies for increased paging capacity in mobile communications networks", ACM Wireless Networks, Vol. 3, No. 2, p. 159–167, 1997, see also http://citeseer.nj.nec.com/rose96ensemble.html).

Consequently, a less restrictive and more efficient concurrent paging scheme is needed. A concurrent paging scheme that minimizes the expected number of the required paging messages would be highly desirable.

It is therefore an object of this invention to provide a concurrent paging scheme that minimizes the expected number of the required paging messages.

It is a further object of this invention to provide concurrent paging schemes that can be easily computed and provide a reduction of the expected number of the required paging messages.

SUMMARY OF THE INVENTION

The objects set forth above as well as further and other objects and advantages of the present invention are achieved by the embodiments of the invention described hereinbelow.

Methods and systems for concurrent paging, in a cellular system having a number of users, where the users are paged to determine a location of each user, are disclosed. The cellular system described is characterized in the following manner. The paging to one of the users originates from one of the cells. Any of the users can be found the cells with given unique probabilities corresponding to the user and the cell. The paging from one cell to one of the users occurs within one of a number of time slots. The time slot in which one of the users is paged from one of the cells is specific of that cell and that user. An array encompassing the totality of the specific time slots constitutes a search schedule. In one of the time slots, only one of the users is paged from one of the cells.

One method of the present invention comprises minimizing a characteristic function of paging performance, the function depending on the search schedule and the probability of finding a user in a cell, and, determining, from the minimization of the characteristic function, the search schedule. The characteristic function can be, but is not limited to, the average paging cost (the expected number of the required paging messages) or the average paging delay.

Two other methods for determining a paging scheme (a search schedule), which are more computationally efficient and which reduce the paging cost, the simple heuristic and the conditional probability heuristic, are disclosed. The simple heuristic method considers two users and two time slots at a time, using two cumulative probabilities, calculated utilizing the first half and second half of the cells respectively, to assign the time slot in which one of the two users is paged from one of the cells. The process is repeated until all pairs of users are considered. If the number of users is an odd number, the last user is paged in the last time slot.

The conditional probability heuristic method produces a dynamic search schedule. Starting with no users located and an updated probability array containing the given unique probabilities, corresponding to a user and a cell, that the user is found in that cell, the method proceeds through all time slots updating the probability array as users are paged or found. At every time slot, the user with the highest non-zero probability in a cell is paged from that cell. If the user is located, all probabilities for that user are set to zero in the subsequent time slots. If a user is paged from a cell but not found, the probability of finding that user in that cell is set to zero. The above procedure is repeated in the next time slot using the updated probability array until all users are located (the updated probability array contains only zeroes) or last time slot is reached.

The present methods can be implemented as computer readable code and in a system utilizing the computer readable code.

For a better understanding of the present invention, together with other and further objects thereof, reference is made to the accompanying drawings and detailed description and its scope will be pointed out in the appended claims.

DETAILED DESCRIPTION OF THE PREFERRED EMBODIMENTS

Figure 1A:
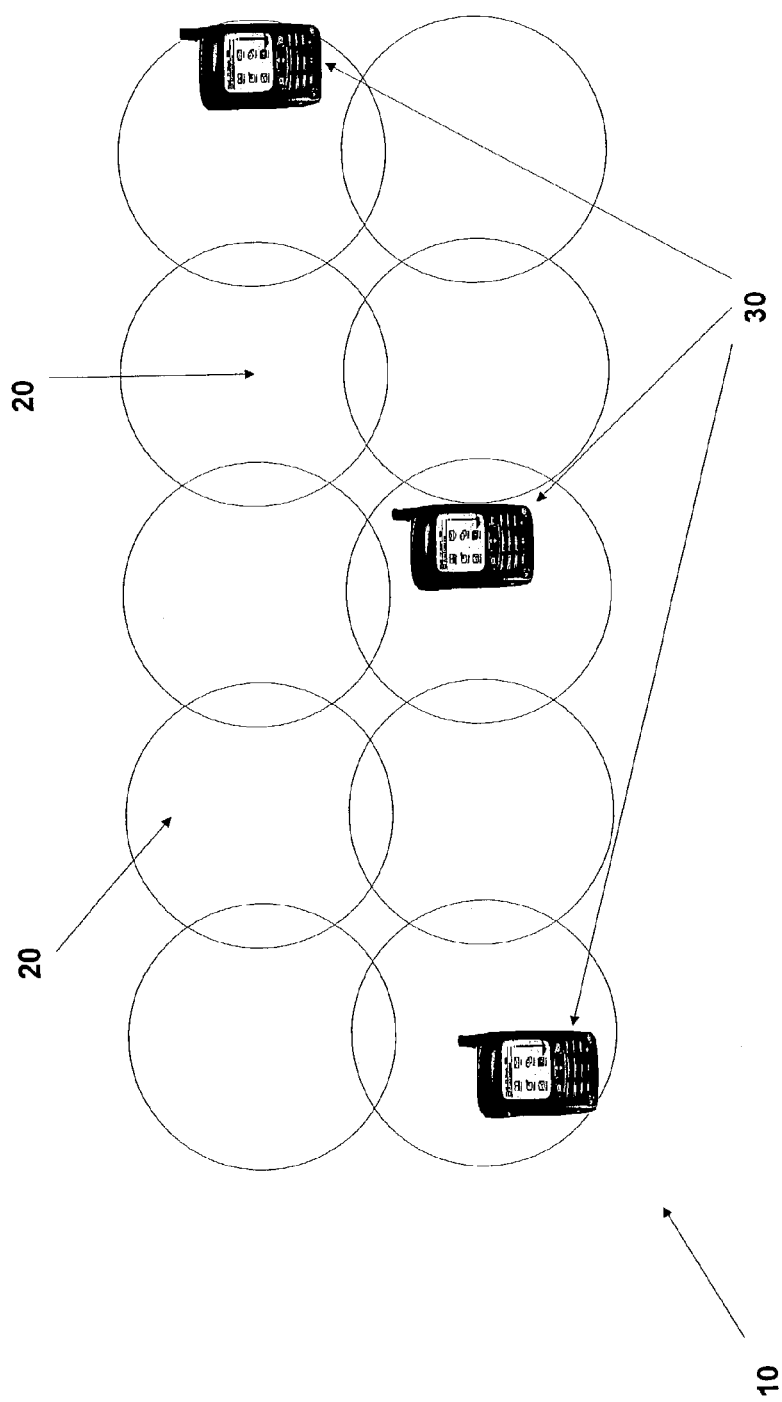
FIG. 1A is an idealized graphical representation of a system comprising a number of cells and a number of users.
Figure 1B:
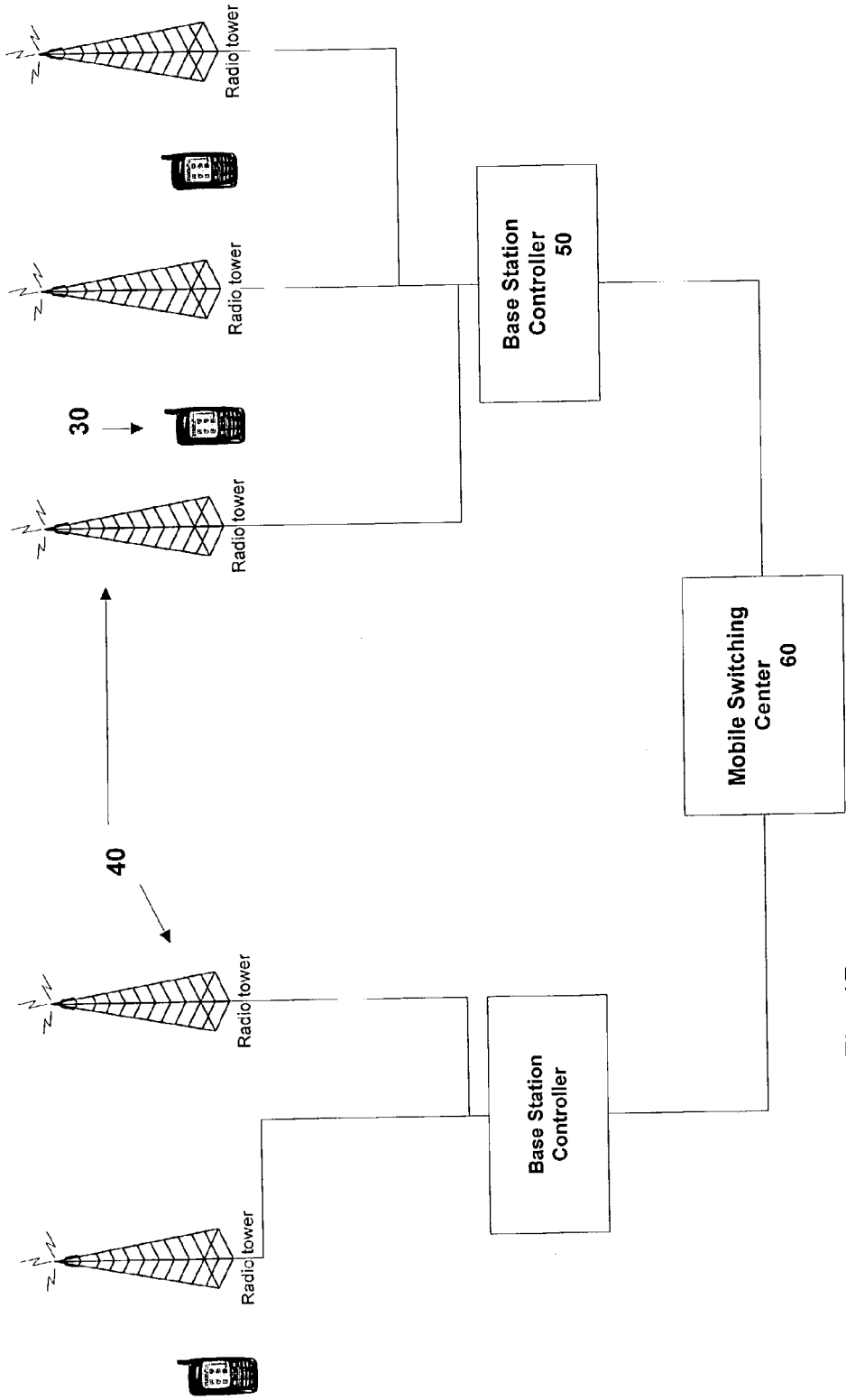
FIG. 1B is a graphical and block representation of an embodiment of a cellular system.

A cellular mobile communications system relies on a network of cells, areas of a radio transmission and reception, with a powerful radio transmitter at the center, a base station. FIG. 1A is an idealized graphical representation of a system 10 comprising a number of cells 20 and a number of user devices 30. Although cells 20 are represented by circles in FIG. 1A, in a real situation, cells 20 have a shape reflecting the local radio propagation properties and such a shape can be highly irregular. FIG. 1B is a graphical and block representation of an embodiment of a cellular system including some of the components of an embodiment of the system of FIG. 1A. Mobile user 30 is in the cell generated by a radio transmitter 40. A group of the radio transmitters 40 is connected to a base station controller 50 that provides set up and control for the radio channels. The base station controllers 50 are connected to a mobile service switching center 60 that includes the functionality needed for location management. Each mobile switching center 60 includes the computational capability and the databases needed for location management and other services such as billing. While the embodiment depicted in FIG. 1B is characteristic of wireless telephony systems, analogous embodiments exist for packet data systems.

Paging involves sending a message informing the user that an incoming message is pending. Referring to FIG. 1A, there are n cells 20 in the network and k users 30 in the network. The probability that user i is in cell j is given by p(i,j). The probability, p(i,j), can be obtained by methods known in the art, for example, the methods given in U.S. Pat. No. 6,181,945, the information-theoretical approach used by Bhattacharya (Amiya Bhattacharya and Sajal K. Das, "LeZi-Update: An Information-Theoretic Approach to Track Mobile Users in PCS Networks", MOBICOM 1999. Pages 1–12), or the methods proposed by Madhavapeddy (S. Madhavapeddy, K. Basu and A. Roberts, "Adaptive Paging Algorithms for Cellular Systems", Proc. Of the Fifth WIN-LAB Workshop on Third Generation Wireless Networks. April 1995, p. 347–361). The paging in one cell to one of the users occurs within one of a number of time slots.

A simple (trivial) example serves to illustrate the difference in paging cost between sequential paging (such as that disclosed in U.S. Pat. No. 6,181,945) and concurrent paging, the object of this invention. In this example, the network includes k cells and n=k users, in which the probability that user i is in cell j is 1−ϵ when i=j, ϵ/(n−1) when i is not equal to j.

An efficient concurrent search scheme, which pages cell i to locate mobile user i in the first time slot, is able to locate all mobile users at the end of the first time slot almost certainly. Therefore, the average number of required paging messages to locate n mobile users is approximately n. In contrast, the straightforward sequential paging scheme requires $n^2$ paging messages.

The index of the time slot in which user i is paged from cell j, x(i,j), is specific of that cell and that user. An array, $\underline{X}$, encompassing the totality of the specific time slots, in which the i,j element $\underline{X}_{i,j}$ is given by x(i,j), constitutes a search schedule. In any of the time slots, only one of the users is paged in one of the cells. The $s^{th}$ paging zone of user i, denoted by Z(i,s), is defined to be the set of cell indices indicating those cells for which user i is paged in time slot s. The probability that user i is inside its s-th paging zone, denoted by π(i,s) is given by Σp(i,j)

where the summation is taken over all cells in Z(i,s). The number of elements in the set Z(i,s) is denoted by m(i,s). Then, the average paging cost, C($\underline{P},\underline{X}$), defined as the expected number of required paging messages to locate mobile users, is given by $$C(\underline{P}, \underline{X}) = \sum_{i=1}^{k}\sum_{s=1}^{d} \pi(i,s) \sum_{\alpha=1}^{s} m(i, \alpha)$$

An example can illustrate the above definitions. If the number of users (k) equals two (2), the number of cells (n) equals four (4), the number of time slots (d) equals three (3), and the probabilities are given by p(1,1)=0.4, p(1,2)=0.3, p(1,3)=0.2, p(1,4)=0.1, p(2,1)=0.3, p(2,2)=p(2,3)=0.25, p(2,4)=0.2, then, the probability matrix is given by $$\underline{P} = \begin{bmatrix} 0.4 & 0.3 & 0.2 & 0.1 \\ 0.3 & 0.25 & 0.25 & 0.2 \end{bmatrix}$$

Assume that to locate mobile user one, the system pages cell 1 and cell 2 in time slot 1, and pages cell 3 in time slot 2, if the user has not been located at the end of time slot 1. If the mobile user has not been located at the end of time slot 2, the system pages cell 4 in time slot 3. Then, Z(1,1)={1,2}, Z(1,2)={3}, and Z(1,3)={4}. Similarly, it is assumed that Z(2,1)={3,4}, Z(2,2)={1,2}, and Z(2,3)=empty set Then, the search schedule is $$\underline{X} = \begin{bmatrix} 1 & 1 & 2 & 3 \\ 2 & 2 & 1 & 1 \end{bmatrix}$$

The values for probability that a user is inside a given paging zone are given by π(1,1)=0.4+0.3=0.7, π(1,2)=0.2 and π(1,3)=0.1. Similarly, π(2,1)=0.25+0.2=0.45, π(2,2)=0.3+0.25=0.55 and π(2,3)=0. The number of elements in each of the sets Z(i,s) is given by m(1,1)=2, m(1,2)=1, m(1,3)=1, m(2,1)=m(2,2)=2 and m(2,3)=0. Then, the average paging cost, C($\underline{P},\underline{X}$), also referred to as the expected number of required paging messages to locate mobile users, is given by C(P,X)=(0.7*2+0.2*3+0.1*4)+(0.45*2+0.55*4+0*4*4) =5.5. If the straightforward sequential paging scheme is used, $$\underline{X} = \begin{bmatrix} 1 & 1 & 1 & 1 \\ 2 & 2 & 2 & 2 \end{bmatrix}$$

then, C(P,X)=2*4=3.

If the number of time slots is greater than or equal to the product of the number of cells (n) and the number of users (d≧k·n), the concurrent search problem is identical to a collection of k independent sequential paging problems. In the embodiments disclosed below, the more interesting case of d<k·n is considered. Specifically, in the embodiments disclosed below, the number of time slots equals the number of users (d=k).

The average paging cost depends on the search schedule and the probability of finding a user in a cell through the dependence of x on the probability and the dependence of m on the index of the time slots that constitute the search schedule. An optimal concurrent search (or paging) schedule, which is an object of this invention, is obtained by minimizing the average paging cost. The optimization problem can be solved by the "brute force" search algorithm, which would simply search for the whole state space of valid search schedules. It should be apparent that other algorithms could be found that would be capable of solving the optimization problem or approximate a solution to the optimization problem.

A similar optimal concurrent search (or paging) schedule can be found by minimizing the minimum average paging delay. The concurrent search (or paging) schedule can be found by minimizing the minimum average paging delay, D($\underline{P}$, $\underline{X}$), given by $$D(\underline{P}, \underline{X}) = (1/k) \sum_{i=1}^{k} \sum_{s=1}^{d} \pi(i, s) * s$$

An optimal concurrent search (or paging) schedule is obtained by minimizing the average paging delay.

The optimal concurrent search obtained by minimizing the average paging cost reduces the expected number of required paging messages to locate mobile users (the average paging cost) over a sequential search. The normalized reduction of the average paging cost for a k times n probability matrix P, denoted by r*(k,n,P), is defined as follows:

$$r^*(k, n, P) = \frac{(C_{seq}(P) - C_k^*(P))}{C_{seq}(P)}$$

where $C_{seq}(P)$ is the average paging cost for a sequential search, and $C^*_k(P)$ is the optimal average paging cost for a concurrent search. It has shown by Gau and Haas (U.S. Provisional Application No. 60/344,286) that even when mobile users appear equally in all of the cells in the network, the concurrent search scheme is able to reduce the average paging cost without increasing the average paging delay or the worst-case paging delay.

Simple Heuristic Algorithm

Although the "brute force" search algorithm guarantees an optimal solution, its computational complexity is exponential and therefore it is not desirable. The simple heuristic algorithm, disclosed below, is a linear-time algorithm and it guarantees the normalized reduction of the average paging cost by at least 16.6%.

Figure 2:
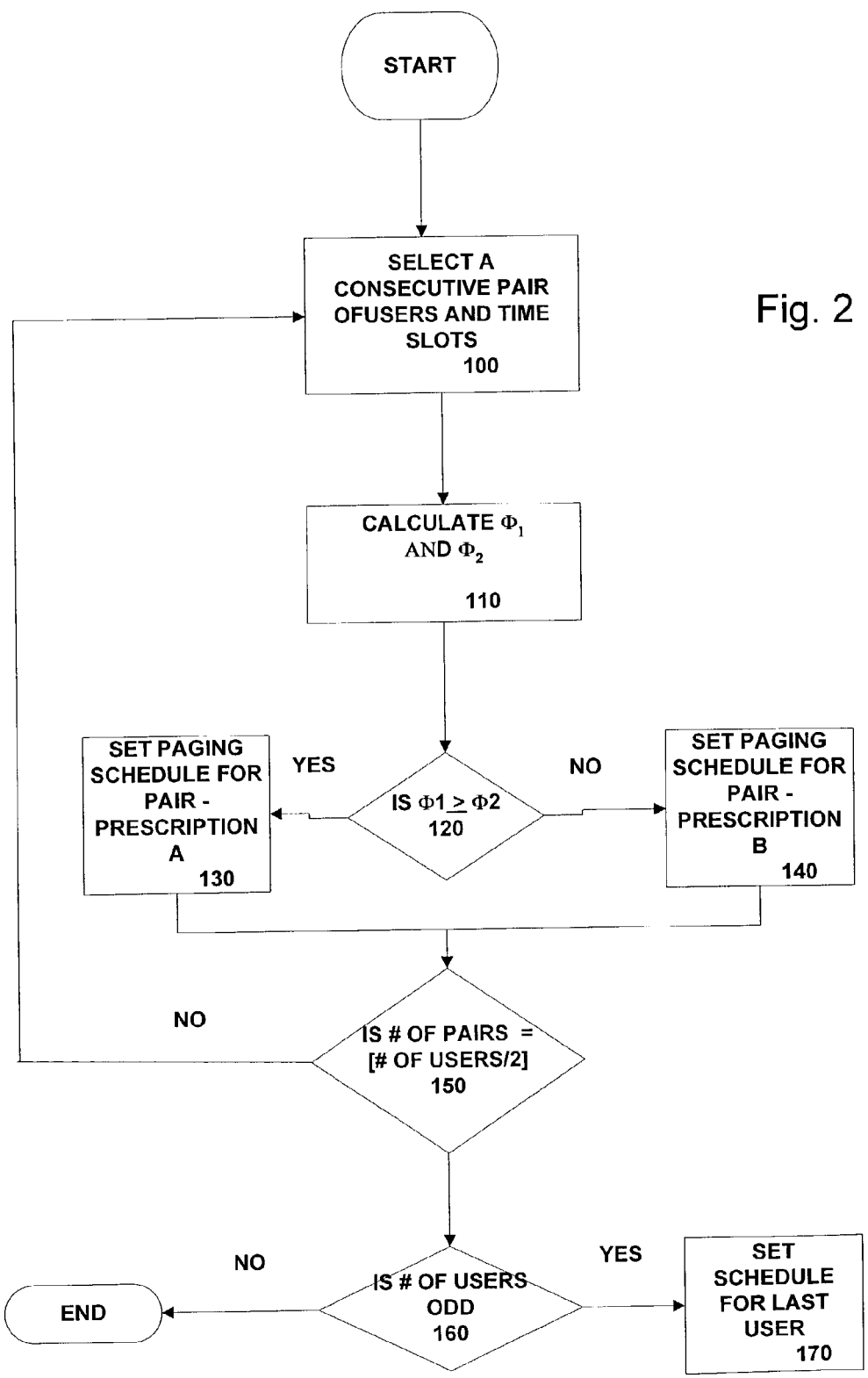
FIG. 2 is a flow chart of an embodiment of the simple heuristic method of this invention for determining a paging scheme.

FIG. 2 is a block diagram of an embodiment of the simple heuristic method for determining a paging scheme. When the number of cells is n, a mid-value of the number of cells ($n_{mid}$) is equal to half the total number of cells (n/2) when the number of cells is even and is equal to half the total number of cells plus one( (n/2)+1) when the number of cells is odd. Referring to FIG. 2, starting with i=1 (where i is the index of the user), a consecutive pair of users and time slots is selected (step 100, FIG. 2). The pair comprises a first user and a first time slot and a second user and a second time slot. A first probability sum, $\Phi_1$, equal to a sum of the probabilities corresponding to the first user and each of the cells ranging from one to the mid-value cell, is computed (step 110, FIG. 2), $$\Phi_1 = \sum_{j=1}^{n_{mid}} p(i_{first}, j)$$

where $i_{first}$ is initially one (1). Then, a second probability sum, $\Phi_2$, equal to a sum of the probabilities corresponding to the second user and each of the cells ranging from the initial one to the mid-value cell is computed (step 110, FIG. 2), $$\Phi_2 = \sum_{j=1}^{n_{mid}} p(i_{second}, j)$$

where $i_{second}$ is initially two (2). The first probability sum and the second probability sum are compared (step 120, FIG. 2). If the first probability sum is greater than or equal to the second probability sum, the paging (search) schedule is obtained (step 130, FIG. 2) by performing the following steps:

1) for cells, ranging from the initial cell to a number equal to the mid value, setting each characteristic number of the time slot, corresponding to the first user and to each cell in the range, equal to the identifying number of the first time slot and setting each characteristic number of the time slot, corresponding to the second user and to each cell in the range, equal to the identifying number of the second time slot, and 2) for cells ranging from a number equal to the mid value plus one to a number equal to the total number of cells, setting each characteristic number of the time slot, corresponding to the first user and to each cell in the range, equal to the identifying number of the second time slot and setting each characteristic number of the time slot, corresponding to the second user and to each cell in the range, equal to the identifying number of the first time slot.

If the first probability sum is less than the second probability sum, the paging (search) schedule is obtained (step 140, FIG. 2) by performing the following steps:

1) for cells ranging from the initial cell to the mid value, setting each characteristic number of the time slot, corresponding to the first user and to each cell in the range, equal to the identifying number of the second time slot and setting each characteristic number of the time slot, corresponding to the second user and to each cell in the range, equal to the identifying number of the first time slot; and 2) for cells with an identifying number ranging from a number equal to the mid value plus one to a number equal to the total number of cells, setting each characteristic number of the time slot, corresponding to the first user and to each cell in the range, equal to the identifying number of the first time slot and setting each characteristic number of the time slot, corresponding to the second user and to each cell in the range, equal to the identifying number of the second time slot.

The above process is repeated (step 150, FIG. 2) for the next consecutive pair of users and time slots until an integer number of pairs equal to half the number of users (truncated to an integer value). If the number of users is odd (step 160, FIG. 2), the last user (after considering all the pairs) is paged simultaneously from all cells in the last time slot. The paging schedule (step 170, FIG. 2) for the last user is obtained by setting each characteristic number of the paging time slot, corresponding to the last user and to each cell, equal to the identifying number of the last time slot.

An example to illustrate the simple heuristic algorithm is given below. For four users being paged in four cells, the probability matrix, giving the probability of finding a user in a cell, is $$P = \begin{matrix} 0.4 & 0.3 & 0.2 & 0.1 \\ 0.3 & 0.25 & 0.25 & 0.2 \\ 0.1 & 0.2 & 0.3 & 0.4 \\ 0.2 & 0.25 & 0.25 & 0.3 \end{matrix}$$

Considering the first two users, $\Phi_1$ is given by 0.4+0.3=0.7, and $\Phi_2$ is given by 0.3+0.25=0.55. Since $\Phi_1$ is greater than $\Phi_2$, x(1,1)=1, x(1,2)=1, x(2,1)=2, x(2,2)=2, x(1,3)=2, x(1,4)=2, x(2,3)=1, x(2,4)=1. Then, considering the next two users, $\Phi_1$ is given by 0.1+0.2=0.3, and $\Phi_2$ is given by 0.2+0.25=0.45. Thus, $\Phi_2$ is greater than $\Phi_1$, and x(3,1)=4, x(3,2)=4, x(3,3)=3, x(3,4)=3, x(4,1)=3, x(4,2)=3, x(4,3)=4, x(4,4)=4. Then, the paging (search) schedule is $$X = \begin{matrix} 1 & 1 & 2 & 2 \\ 2 & 2 & 1 & 1 \\ 4 & 4 & 3 & 3 \\ 3 & 3 & 4 & 4 \end{matrix}$$

If the number of users were odd, five (5) for example, then, the last row in the paging schedule would have all fives (5). The normalized reduction of the average paging cost for a k times n probability matrix $\underline{P}$, is defined as above except that $C^*_k(P)$ is now the average paging cost obtained from the results of the heuristic algorithm. It has shown by Gau and Haas (U.S. Provisional Application No. 60/344,286) that a 16.6% to 25% reduction in average paging cost is obtained when the concurrent search schedule is calculated by means of the simple heuristic algorithm and that use of a concurrent search schedule calculated by means of the simple heuristic algorithm does not increase the paging delay.

Figure 3:
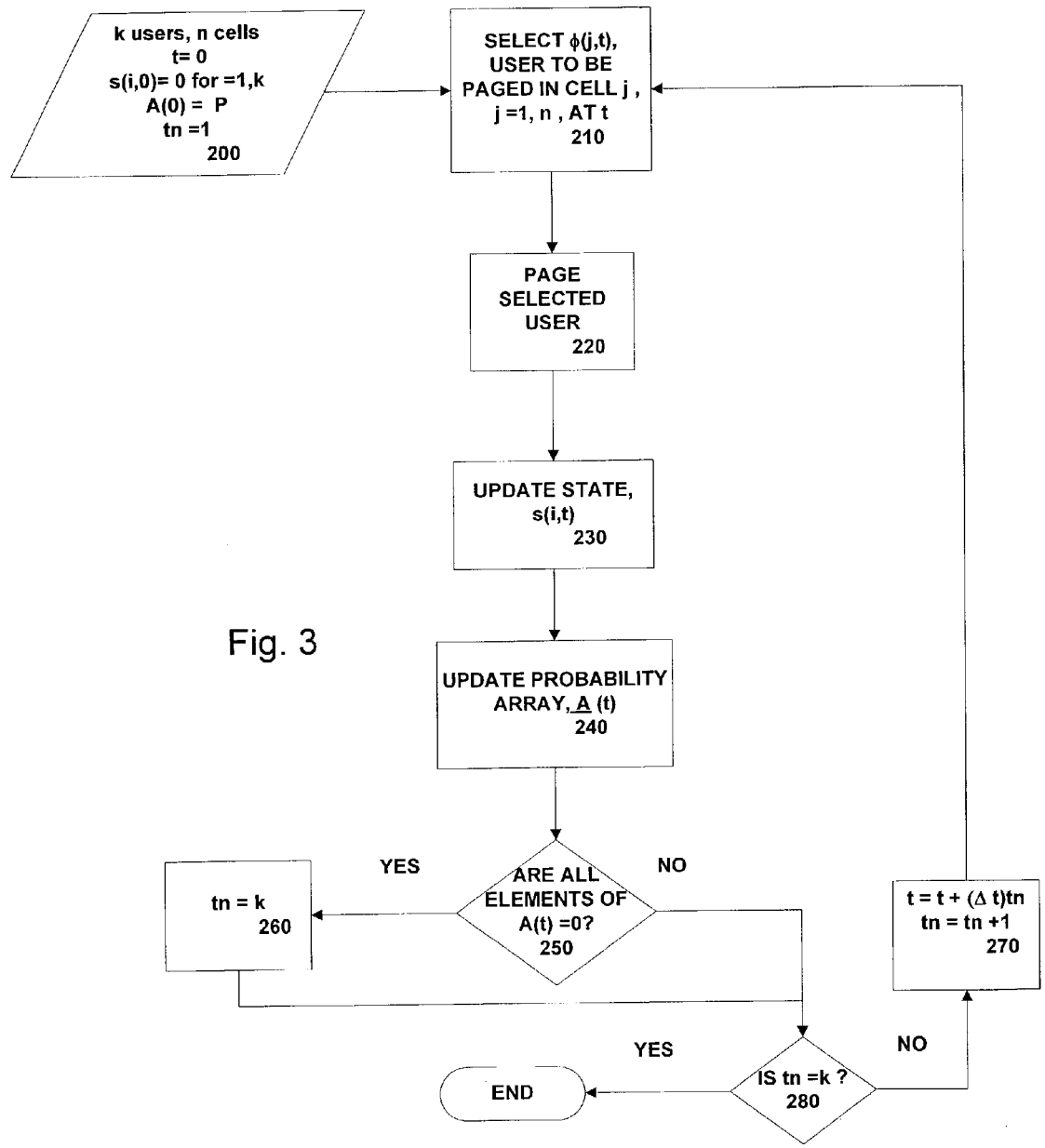
FIG. 3 is a flow chart of an embodiment of the conditional probability heuristic method of this invention for determining a paging scheme.

Conditional Probability Heuristic Algorithm To further reduce the average paging cost, a conditional probability heuristic algorithm to obtain a dynamic schedule is disclosed herein below. Unlike a static schedule, a dynamic schedule is not fully determined at the beginning of the first time slot. Instead, a dynamic schedule is obtained based on the paging results of the previous time slots. FIG. 3 is a block diagram of an embodiment of the conditional probability heuristic method for determining a paging scheme. In every time slot, before paging, a unique state is defined for every user, s(i,t). The state is an indicator of whether the user has been located, and has a value of zero if the user has not been located and a value of 1 otherwise. Also, in every time slot, before paging, an updated probability array, $\underline{A}(t)$ is calculated reflecting the certainty of finding the users that have been located.

At the initial time slot, the updated probability array is set equal to the initial probability array, $\underline{P}$. Also, at the initial time slot the state for every user is set to indicate that no users have been located (data block 200, FIG. 3). A time slot counter, tn, is established and set to 1. For each cell, at the current time slot, select, according to a selection criterion, one user, $\phi$(j,tn), to be paged (step 210, FIG. 3). In one embodiment, the selection criterion used is the maximum probability criterion. That is, at each cell, the user with maximum probability, from the updated probability array, is selected to be paged. At each cell j (j=1,n), the selected user, $\phi$(j,tn), is paged (step 220, FIG. 3). From the results of paging, the state and probability array are updated. If a user is found, the state of that user, s(i,tn+1) is set to one (1), otherwise the state remains as it was previous to paging (step 230, FIG. 3). The probability matrix is updated (step 240, FIG. 3) as follows:

a) if a user has been located, the state of the user is s(i,tn+1)=1, then the probabilities for that user in all cells are set to zero; that is $A(tn+)_{i,j}=0$ for j=1,n, where n is the number of cells;

b) if the user has not been located, the probabilities for those cells from which the user has been paged are set to zero; that is, $A(tn+1)_{i,j}=0$ for all j such that $\phi$(j,tn)=i;

c) the non zero values of the probabilities have to be adjusted to renormalize them or, in other words, adjust them for the known information (also known as the conditional probability calculation), that is $$A(tn+1)_{i,j} = \frac{A(tn)_{i,j}}{1 - \sum_{\alpha:\phi(\alpha,tn)=i} A(tn)_{i,\alpha}} \text{ for all } j \text{ such that } \phi(j,tn) \neq i$$

(for those cells from which that user was not paged).

If all probabilities are zero (step 250, FIG. 3), then all users have been located and the algorithm ends (steps 260, 280, FIG. 3). If the time slot is the last time slot (equal to the number of users, as determined in step 280, FIG. 3), the algorithm ends. If all probabilities are not zero and the time slot is not the last time slot, the algorithm, increments the time slot counter, moves to next time slot (step 270, FIG. 3) and repeats the above steps.

The Conditional Probability Heuristic Algorithm can be illustrated by the following example with 3 users and 4 cells. The initial probability matrix is $$P = \begin{matrix} 0.4 & 0.3 & 0.2 & 0.1 \\ 0.3 & 0.25 & 0.25 & 0.2 \\ 0.1 & 0.2 & 0.3 & 0.4 \end{matrix}$$

At the first time slot, tn=1, the probability matrix is equal to the initial probability matrix and the state of all users is zero (step 200, FIG. 3).

According to the maximum probability criterion, in time slot one (1), page user 1 in cell 1, page user 1 in cell 2, page user 3 in cells 3 and 4 (step 210, FIG. 3). A search schedule row vector then is X(1, i)=[1 1 3 3]

Users are paged and User 1 is found in this time slot (Step 220, FIG. 3). Then, upon updating the state, s(1, 2)=1 and all other states are zero (step 230, FIG. 3) Updating the probability matrix (step 240, FIG. 3), $A(2)_{i,j}=0$ for j=1,4, and $A(2)_{3,3}=A(2)_{3,4}=0$ since user 3 was paged from cells 3 and 4, $$A(2)_{3,1} = \frac{0.1}{1-(0.3+0.4)} = \frac{1}{3} \text{ and, similarly, } A(2)_{3,2} = \frac{0.2}{0.3} = \frac{2}{3};$$

$$A(2) = \begin{matrix} 0 & 0 & 0 & 0 \\ 0.3 & 0.25 & 0.25 & 0.2 \\ \frac{1}{3} & \frac{2}{3} & 0 & 0 \end{matrix}$$

The elements of A(2) are not all zero (step 250, FIG. 3). Thus, tn increases to 2 (step 270, FIG. 3). Repeating steps 210 and 220, according to the maximum probability criterion, in time slot two (2), page user 3 in cell 1, page user 3 in cell 2, page user 2 in cells 3 and 4. A search schedule row vector then is X(2, i)=[3 3 2 2]

User 3 is found in time slot 2. Then, upon updating the state, s(3, 3)=1 and s(2,3) is zero (step 230, FIG. 3). Updating the probability matrix (step 240, FIG. 3),
A(3)$_{3,j}$=0 for j=1, 4 since user 3 was located;
A(3)$_{2,3}$=A(3)$_{2,4}$=0 since user 2 was paged from cells 3 and 4;

$$A(3)_{2,1} = \frac{0.3}{1-(0.25+0.2)} = \frac{0.3}{0.55} = \frac{6}{11} \text{ and } A(3)_{2,2} = \frac{0.25}{0.55} = \frac{5}{11};$$

$$A(3) = \begin{matrix} 0 & 0 & 0 & 0 \\ \frac{6}{11} & \frac{5}{11} & 0 & 0 \\ 0 & 0 & 0 & 0 \end{matrix}$$

The elements of A(3) are not all zero (step 250, FIG. 3). Thus, tn increases to 4 (step 270, FIG. 3). Repeating steps 210 and 220, according to the maximum probability criterion, in time slot three (3), page user 2 in cells 1 and 2. A search schedule row vector then is X(3, i)=[2 2]

User 2 is found in time slot 3. Updating the probability matrix (step 240, FIG. 3),
A(4)$_{2,1}$=A(4)$_{2,2}$=0 since user 2 was located; and $$A(4) = \begin{matrix} 0 & 0 & 0 & 0 \\ 0 & 0 & 0 & 0 \\ 0 & 0 & 0 & 0 \end{matrix}$$

Since the elements of A(4) are all zero (step 250, FIG. 3), the algorithm terminates.

The advantages of the methods of this invention can be best seen from the simulations presented below. In these simulations, for a network of n=w² cells, the probability that mobile user t is in a cell indexed by ($\alpha,\beta$) is given by $$\frac{r^{d(\alpha,\beta,\alpha^*,\beta^*)}}{\sum_{i=0}^{w-1}\sum_{j=0}^{w-1} r^{d(i,j,\alpha^*,\beta^*)}}$$

where r, the decay factor, is a real number between 0 and 1, $\alpha^*,\beta^*$ are uniformly distributed random integers variables between 0 and (w−1), and d is the distance between two cells, given by $d(\alpha_1, \beta_1, \alpha_2, \beta_2)=|\alpha_1-\alpha_2|+|\beta_1-\beta_2|$.

Figure 4:
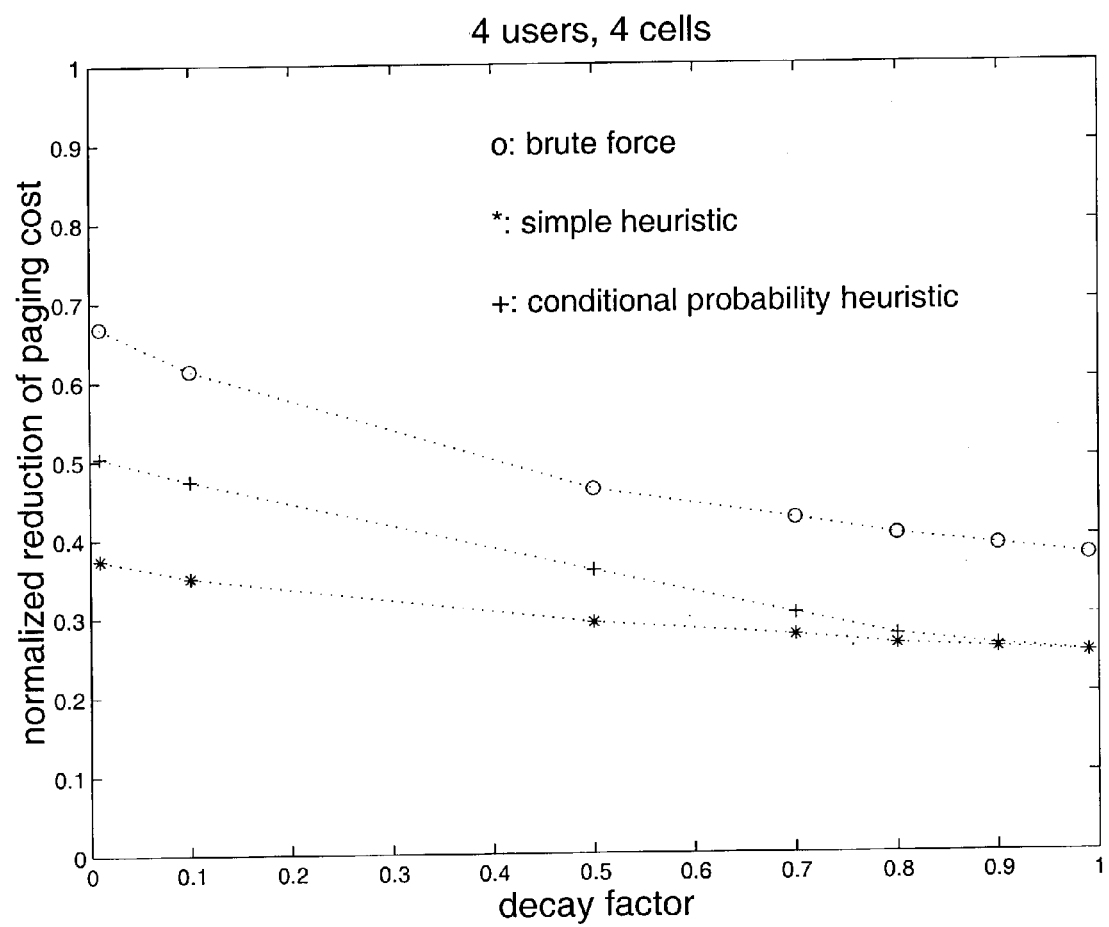
FIG. 4 depicts the results of paging simulations for the reduction in paging cost, over paging cost resulting from paging according to a sequential search, when paging is performed according to a schedule generated by concurrent optimal search method, according to a schedule generated by the simple heuristic method, and according to a schedule generated by the conditional probability heuristic method, where the sequential search is conducted by paging every cell for $t^{th}$ user in the $t^{th}$ time slot, for 4 users and 4 cells.
Figure 5:
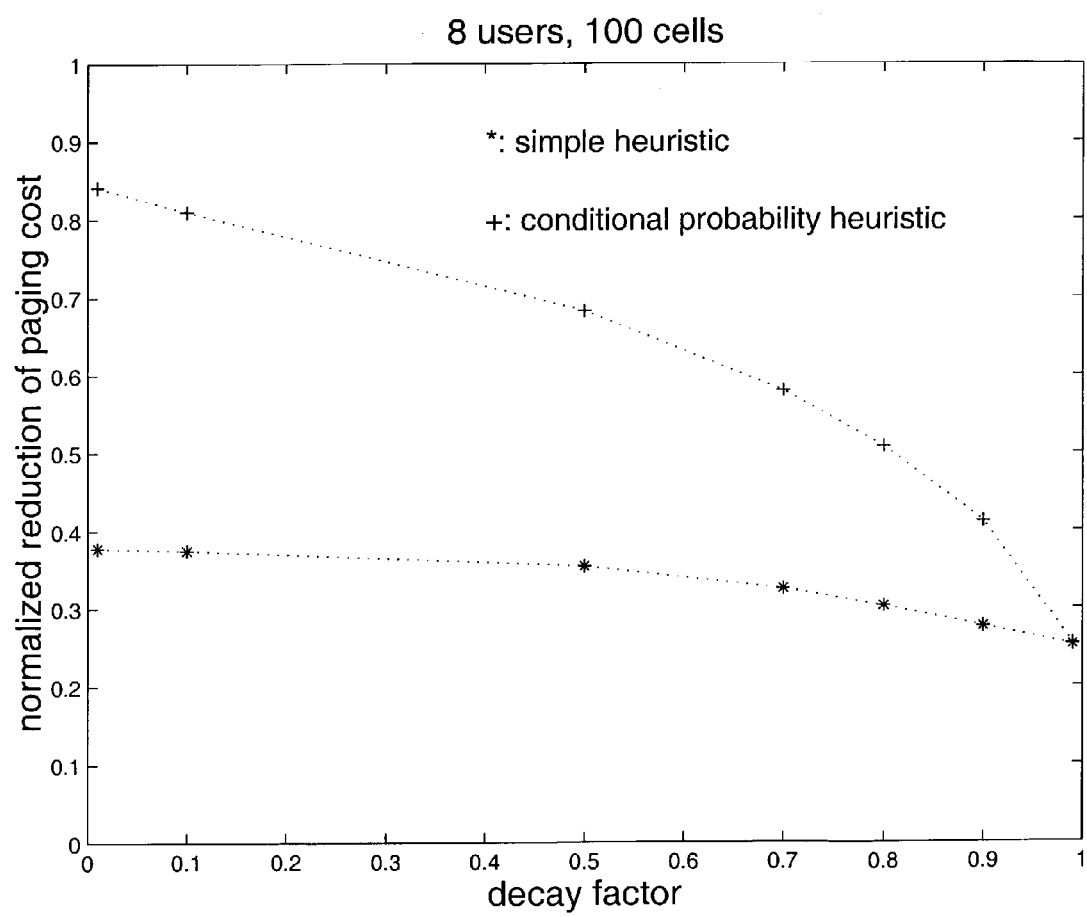
FIG. 5 depicts the results of the paging simulations for the reduction in paging cost, over paging cost resulting from paging according to a sequential search generated as that of FIG. 4, when paging is performed according to a schedule generated by the simple heuristic method, and according to a schedule generated by the conditional probability heuristic method, for 8 users and 100 cells.
Figure 6:
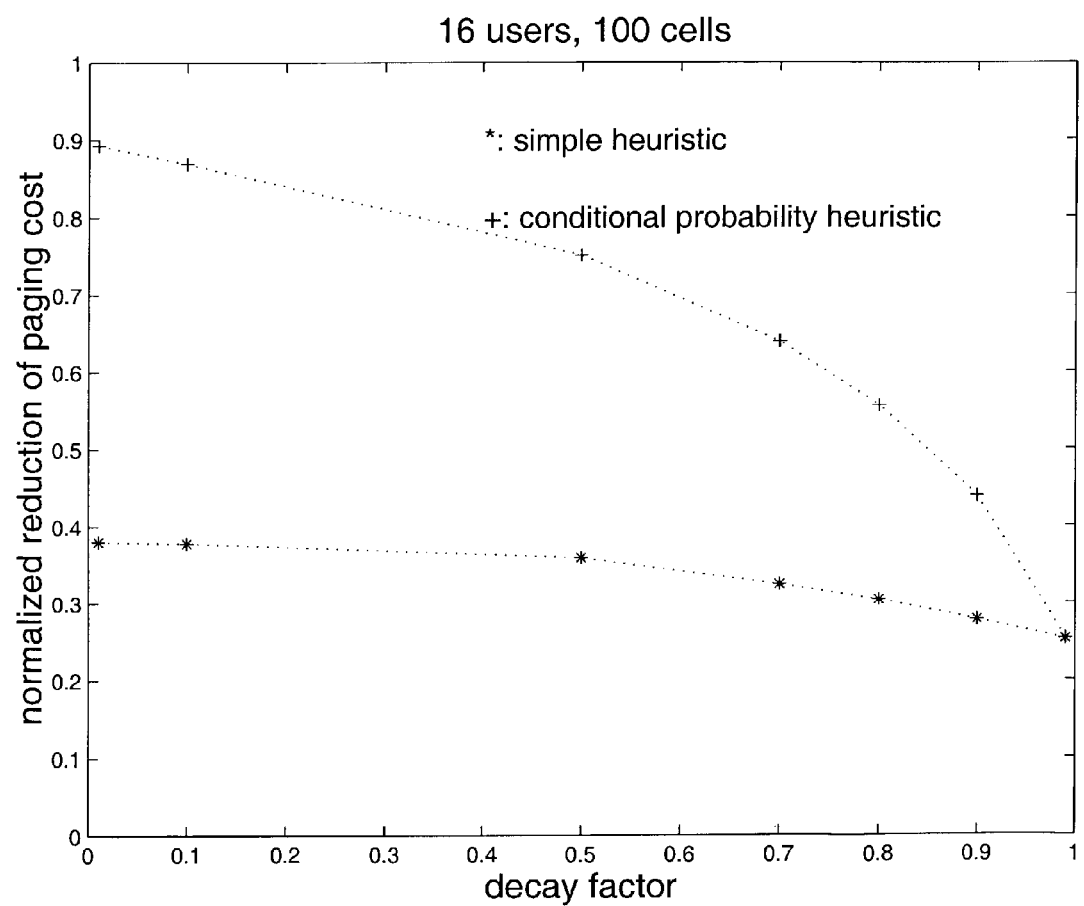
FIG. 6 depicts the results of paging simulations for the reduction in paging cost, over paging cost resulting from paging according to a sequential search generated as that of FIG. 4, when paging is performed according to a schedule generated by the simple heuristic method, and according to a schedule generated by the conditional probability heuristic method, for 16 users and 100 cells.

When the decay factor is very close to 1 (0.99), the users appear with almost equal probability in the cells. Under these conditions, the reduction in "paging cost" over a sequential search is the smallest. Alternatively, when the decay factor is closest to zero, the concurrent search produces the largest reduction in "paging cost" over a sequential search. In order to conduct the simulations, the "quasi-random" variables are generated by means known in the art. FIGS. 4, 5, and 6 depict the results of the simulations when the sequential search is conducted by paging every cell for $t^{th}$ user in the $t^{th}$ time slot.

As can be seen from FIG. 4, the optimal search provides the largest reduction in the paging cost and the difference in a reduction in paging cost between the optimal search, the simple heuristic search and the conditional probability heuristic search is always less than 15%. As can be seen from a FIG. 5, for 8 users and 100 cells, the conditional probability heuristic search provides a very large reduction in the paging cost, but the simple heuristic search provides a 35% reduction in the paging cost for small values of the decay factor (non uniform probability distribution of users among the cells). Similar results are obtained for 16 users and 100 cells, as can be seen from FIG. 6.

As can be inferred by the simulations, the methods of this invention can be implemented as computer readable code that it is typically embodied in a computer usable (readable) medium. The computer readable code embodied in a computer readable medium can cause one or many processors in a system to generate a search schedule, which is then used to page users in a cellular network. In one embodiment, the one or many processors and the one or many computer readable media are located in the message switching center 60 of FIG. 1B. The search schedule, if the probabilities are known beforehand, could be generated and then stored in a computer readable medium. A system with one or many processors and one or several schedules stored in one or many computer readable media can be used to page users in a cellular network.

The methods of this invention avoid the high average paging cost due to searching users one by one. Although sequential paging schemes have been proposed to reduce the average paging cost, such as the method disclosed in U.S. Pat. No. 6,181,945, the concurrent search schedule generated by the methods of this invention presents an improvement over the sequential paging schedule. The sequential paging schedule is designed to locate a single user, while the concurrent search schedule of this invention is designed to locate a number of users simultaneously. The sequential paging scheme reduces the average paging cost at the expense of increasing the worst case paging delay. The concurrent search schedule of this invention does not increase the worst-case paging delay.

Each computer program within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, a carrier wave, or any other medium from which a computer can read.

Elements and components described herein may be further divided into additional components or joined together to form fewer components for performing the same functions.

Although the invention has been described with respect to various embodiments, it should be realized this invention is also capable of a wide variety of further and other embodiments within the spirit and scope of the appended claims.

What is claimed is:

1. A method for concurrently paging, in a cellular system having a plurality of users, the users being paged to determine a location of each user, the paging to one of the plurality of users originating from one of a plurality of cells, any of the users being located in any of the cells with a given unique probability corresponding to the user and the cell, the paging from the cell to one of the users occurring within one of a plurality of time slots, the time slot in which one of the users is paged in one of the cells being a characteristic of the one cell and the one user, and wherein, in one of said time slots, only one of the users is paged from one of the cells, the method comprising the steps of:

minimizing a characteristic function of paging performance, said function depending on a search schedule and the probability of finding a user in a cell;
   wherein said search schedule comprises a two dimensional array of indices of a time slot in which one user is paged from one cell;
determining, from the minimization of the characteristic function, an optimal search schedule;
   whereby users from said plurality of users are paged simultaneously.

2. The method of claim 1 wherein the step of minimizing said characteristic function comprises obtaining a minimum average paging cost.

3. The method of claim 1 wherein the step of minimizing said characteristic function comprises obtaining a minimum average paging delay.

4. A method for concurrently paging in a cellular system having a plurality of users, the users being paged to determine a location of each user, the paging to one of the plurality of users originating from one of a plurality of cells, any of the users being located in any of the cells with a given unique probability corresponding to the user and the cell, the paging from the cell to one of the users occurring within one of a plurality of time slots, the time slot in which one of the users is paged in one of the cells being a characteristic of the one cell and the one user, and, wherein, in one of said time slots, only one of the users is paged from one of the cells, the method comprising the steps of:

minimizing a characteristic function of paging performance:
   wherein the step of minimizing a characteristic function of paging performance comprises the steps of:
      A) selecting a pair of users, a first user and a second user, from the plurality of users;
      B) selecting a pair of time slots, a first time slot and a second time slot, from the plurality of time slots;
      C) determining, from the unique probability of any of the users being located in any of the cells, which of said first and said second users has a higher probability of being located in a pre-selected range from the plurality of cells;
      D) if it is more probable that said first user be located in said pre-selected range, performing the following steps:
         paging said first user from said first time slot in each cell from said pre-selected range;
         paging said second user from said second time slot in each cell from said pre-selected range;
         paging said first user from said second time slot in each cell from another pre-selected range of said plurality of cells; and,
         paging said second user from said first time slot in each cell from said another pre-selected range;
      E) if it is more probable that said second user be located in any cell from said pre-selected range, performing the following steps:
         paging said first user from said second time slot in each cell from said pre-selected range;
         paging said second user from said first time slot in each cell from said pre-selected range;
         paging said first user from said first time slot in each cell from said another pre-selected range; and,
         paging said second user from said second time slot in each cell from said another pre-selected range;
      F) repeating steps A through E for a next pair of users and a next pair of time slots until all pairs of users are selected;
whereby, from the minimization of the characteristic function, a search schedule is determined;
wherein said search schedule comprises a two dimensional array of indices of a time slot in which one user is paged from one cell.

5. The method of claim 4 further comprising the step of:
   G) paging a last user from the plurality of users from a last time slot if a total number of users from the plurality of users is odd and a total number of time slots from the plurality of time slot is odd.

6. A method for concurrently paging, in a cellular system having a plurality of users, the users being paged to determine a location of each user, the paging to one of the plurality of users originating from one of a plurality of cells, any of the users being located in any of the cells with a given unique probability corresponding to the user and the cell, the paging from the cell to one of the users occurring within one of a plurality of time slots, the time slot in which one of the users is paged in one of the cells being a characteristic of the one cell and the one user, and, wherein, in one of said time slots, only one of the users is paged from one of the cells, the method comprising the steps of:

minimizing a characteristic function of paging performance:
   wherein the step of minimizing a characteristic function of paging performance comprises the steps of:
      A) obtaining a probability array having as initial value an array comprising a totality of the unique probabilities;
      B) selecting an initial time slot from the plurality of time slots;
      C) selecting, for each one cell from the plurality of cells, one user to be paged from the plurality of users;
      D) paging the selected user in said each one cell;
      E) determining from said paging whether the selected user has been located;

F) updating the probability array according to said paging;
G) proceeding to a next time slot from the plurality of time slots;
H) repeating the steps C through G unless a predetermined condition is satisfied;
and determining, from the minimization of the characteristic function, a search schedule;
wherein said search schedule comprises a two dimensional array of indices of a time slot in which one user is paged from one cell.

7. The method of claim 6 wherein said predetermined condition comprises said next time slot being a last time slot from said plurality of time slots or all users from the plurality of users being located.

8. The method of claim 6 wherein said selection criterion, according to which a user is selected to paged in each cell, comprises selecting the user with maximum probability.

9. A computer program product comprising: a computer usable medium having computer readable code embodied therein for concurrently paging, in a cellular system having a plurality of users, the users being paged to determine a location of each user, the paging to one of the plurality of users originating from one of a plurality of cells, any of the users being located in any of the cells with a given unique probability corresponding to the user and the cell, the paging from the cell to one of the users occurring within one of a plurality of time slots, the time slot in which one of the users is paged in one of the cells being a characteristic of the one cell and the one user, and, wherein, in one of said time slots, only one of the users is paged from one of the cells, said computer program product comprising:
computer readable code means for causing a computer system to minimize a characteristic function of paging performance, said function depending on a search schedule and a probability of finding a user in a cell;
wherein said search schedule comprises a two dimensional array of indices of a time slot in which one user is paged from one cell; and
computer readable code means for causing a computer system to determine, from the minimization of the characteristic function, an optimal search schedule;
wherein said optimal search schedule enables simultaneous paging.

10. The computer program product of claim 9 wherein said computer readable code means for causing a computer system to minimize a characteristic function comprise computer readable code means for causing a computer system to obtain a minimum average paging cost.

11. The computer program product of claim 9 wherein said computer readable code means for causing a computer system to minimize a characteristic function comprise computer readable code means for causing a computer system to obtain a minimum average paging delay.

12. A computer program product comprising:
a computer usable medium having computer readable code embodied therein for concurrently paging, in a cellular system having a plurality of users, the users being paged to determine a location of each user, the paging to one of the plurality of users originating from one of a plurality of cells, any of the users being located in any of the cells with a given unique probability corresponding to the user and the cell, the paging from the cell to one of the users occurring within one of a plurality of time slots, the time slot in which one of the users is paged in one of the cells being a characteristic of the one cell and the one user, and, wherein, in one of said time slots, only one of the users is paged from one of the cells, the computer program product: comprising:
computer readable code means for causing a computer system to minimize a characteristic function of paging performance;
wherein said computer readable code means for causing said computer system to minimize a characteristic function of paging performance cause said computer system to:
A) select a pair of users, a first user and a second user, from the plurality of users;
B) select a pair of time slots, a first time slot and a second time slot, from the plurality of time slots;
C) determine, from the unique probability of any of the users being located in any of the cells, which of said first and said second users has a higher probability of being located in a pre-selected range from the plurality of cells;
D) if it is more probable that said first user be located in said pre-selected range, perform the following steps:
page said first user from said first time slot in each cell from said pre-selected range;
page said second user from said second time slot in each cell from said pre-selected range;
page said first user from said second time slot in each cell from another pre-selected range of said plurality of cells; and,
page said second user from said first time slot in each cell from said another pre-selected range;
E) if it is more probable that said second user be located in any cell from said pre-selected range, perform the following steps:
page said first user from said second time slot in each cell from said pre-selected range;
page said second user from said first time slot in each cell from said pre-selected range;
page said first user from said first time slot in each cell from said another pre-selected range; and,
page said second user from said second time slot in each cell from said another pre-selected range;
F) repeat steps A through E for a next pair of users and a next pair of time slots until all pairs of users are selected;
computer readable code means for causing said computer system to determine, from the minimization of the characteristic function, a search schedule;
wherein said search schedule comprises a two dimensional array of indicies of a time slot in which one user is paged from one cell which enables concurrent paging.

13. The computer program product of claim 12 wherein said computer readable code means for causing said computer system to minimize a characteristic function of paging performance further cause said computer system to:
G) page a last user from the plurality of users from a last time slot if a total number of users from the plurality of users is odd and a total number of time slots from the plurality of time slot is odd.

14. A computer program product comprising:
a computer usable medium having computer readable code embodied therein for concurrently paging, in a cellular system having a plurality of users, the users being paged to determine a location of each user, the paging to one of the plurality of users originating from one of a plurality of cells, any of the users being located in any of the cells with a given unique probability corresponding to the user and the cell, the paging from the cell to one of the users occurring within one of a plurality of time slots, the time slot in which one of the users is paged in one of the cells being a characteristic of the one cell and the one user, and, wherein, in one of said time slots, only one of the users is paged from one of the cells, the computer program product comprising:

computer readable code means for causing a computer system to minimize a characteristic function of paging performance;

wherein said computer readable code means for causing said computer system to minimize a characteristic function of paging performance are capable of causing said computer system to:

A) obtain a probability array having as initial value an array comprising a totality of the unique probabilities;

B) select an initial time slot from the plurality of time slots;

C) select for each one cell from the plurality of cells, one user to be paged from the plurality of users;

D) page the selected user in said each one cell;

E) determine from said paging whether the selected user has been located;

F) update the probability array according to said paging;

G) proceed to a next time slot from the plurality of time slots;

H) repeat the steps C through G unless a predetermined condition is satisfied;

computer readable code means for causing said computer system to determine, from the minimization of the characteristic function, a search schedule;

wherein said search schedule comprises a two dimensional array of indices of a time slot in which one user is paged from one cell, which enables concurrent paging.

15. The computer program product of claim 14 wherein said selection criterion, according to which a user is selected to paged in each cell, comprises selecting the user with maximum probability.

16. The computer program product of claim 14 wherein said predetermined condition comprises said next time slot being a last time slot from the plurality of time slots or all users from the plurality of users being located.

17. A system for concurrently paging, in a cellular system having a plurality of users, the users being paged to determine a location of each user, the paging to one of the plurality of users originating from one of a plurality of cells, any of the users being located in any of the cells with a given unique probability corresponding to the user and the cell, the paging from the cell to one of the users occurring within one of a plurality of time slots, the time slot in which one of the users is paged in one of the cells being a characteristic of the one cell and the one user, and, wherein, in one of said time slots, only one of the users is paged from one of the cells, the system comprising:

at least one processor;

at least one computer readable medium, having computer readable code embodied therein, said code causing the at least one processor to:

minimize a characteristic function of paging performance, said function depending on a search schedule and a probability of finding a user in a cell;

wherein said search schedule comprises a two dimensional array of indices of a time slot in which one user is paged from one cell:

determine, from the minimization of the characteristic function, the an optimal search schedule;

wherein said optimal search schedule enables simultaneous paging.

18. The system of claim 17 wherein said minimizing a characteristic function comprises obtaining a minimum average paging cost.

19. The system of claim 17 wherein said minimizing a characteristic function comprises obtaining a minimum average paging delay.

20. A system for concurrently paging in a cellular system having a plurality of users, the users being paged to determine a location of each user, the paging to one of the plurality of users originating from one of a plurality of cells, any of the users being located in any of the cells with a given unique probability corresponding to the user and the cell, the paging from the cell to one of the users occurring within one of a plurality of time slots, the time slot in which one of the users is paged in one of the cells being a characteristic of the one cell and the one user, and, wherein, in one of said time slots, only one of the users is paged from one of the cells, the system comprising:

at least one processor:

at least one computer readable medium, having computer readable code embodied therein, said code causing the at least one processor to:

A) select a pair of users, a first user and a second user, from the plurality of users;

B) selecting a pair of time slots, a first time slot and a second time slot, from the plurality of time slots;

C) determining, from the unique probability of any of the users being located in any of the cells, which of said first and said second users has a higher probability of being located in a pre-selected range from the plurality of cells;

D) if it is more probable that said first user be located in said pre-selected range, performing the following steps:

paging said first user from said first time slot in each cell from said pre-selected range;

paging said second user from said second time slot in each cell from said pre-selected range;

paging said first user from said second time slot in each cell from another pre-selected range of said plurality of cells; and, paging said second user from said first time slot in each cell from said another pre-selected range;

E) if it is more probable that said second user be located in any cell from said pre-selected range, performing the following steps:

paging said first user from said second time slot in each cell from said pre-selected range;

paging said second user from said first time slot in each cell from said pre-selected range;

paging said first user from said first time slot in each cell from said another pre-selected range; and, paging said second user from said second time slot in each cell from said another pre-selected range;

F) repeating steps A through E for a next pair of users and a next pair of time slots until all pairs of users are selected;

wherein a search schedule is determined;
wherein said search schedule comprises a two dimensional all of indices of a time slot in which one user is paged from one cell, which enables concurrent paging.

21. The system of claim 20 wherein said code is capable of further causing said at least one processor to:
G) page a last user from said plurality of users from a last time slot if a total number of users from said plurality of users is odd and a total number of time slots from said plurality of time slot is odd.

22. A system for concurrently paging, in a cellular system having a plurality of users, the users being paged to determine a location of each user, the paging to one of the plurality of users originating from one of a plurality of cells, any of the users being located in any of the cells with a given unique probability corresponding to the user and the cell, the paging from the cell to one of the users occurring within one of a plurality of time slots, the time slot in which one of the users is paged in one of the cells being a characteristic of the one cell and the one user, and, wherein, in one of said time slots, only one of the users is paged from one of the cells, the system comprising:
at least one processor;
at least one computer readable medium, having computer readable code embodied therein, said code causing the at least one processor to:
A) obtain a probability array having as initial value an array comprising a totality of the unique probabilities;
B) select an initial time slot from the plurality of time slots;
C) select for each one cell from the plurality of cells, one user to be paged from the plurality of users;
D) page the selected user in said each one cell;
E) determine from said paging whether the selected user has been located;
F) update the probability array according to said paging;
G) proceed to a next time slot from the plurality of time slots;
H) repeat the steps C through G unless a predetermined condition is satisfied;
wherein a search schedule is determined;
wherein said search schedule comprises a two dimensional array of indices of a time slot in which one user is paged from one cell, which enables concurrent paging.

23. The system of claim 22 wherein said selection criterion, according to which a user is selected to paged in each cell, comprises selecting the user with maximum probability.

24. The system of claim 22 wherein said predetermined condition comprises said next time slot being a last time slot from the plurality of time slots or all users from the plurality of users being located.

25. A concurrent paging schedule for concurrently paging, in a cellular system having a plurality of users, the users being paged to determine a location of each user, the paging to one of the plurality of users originating from one of a plurality of cells, any of the users being located in any of the cells with a given unique probability corresponding to the user and the cell, the paging from the cell to one of the users occurring within one of a plurality of time slots, the time slot in which one of the users is paged in one of the cells being a characteristic of the one cell and the one user, and, wherein, in one of said time slots, only one of the users is paged from one of the cells, the concurrent paging schedule obtained by the steps of:

minimizing a characteristic function of paging performance, said function depending on a search schedule and a probability of finding a user in a cell;
wherein said search schedule comprises a two dimensional array of indices of a time slot in which one user is passed from one cell,
determining, from the minimization of the characteristic function, an optimal search schedule;
wherein said optimal search schedule enables concurrent paging.

26. The paging schedule of claim 25 wherein the step of minimizing a characteristic function comprises obtaining a minimum average paging cost.

27. The paging schedule of claim 25 wherein the step of minimizing a characteristic function comprises obtaining a minimum average paging delay.

28. A concurrent paging schedule for concurrently paging, in a cellular system having a plurality of users, the users being paged to determine a location of each user, the paging to one of the plurality of users originating from one of a plurality of cells, any of the users being located in any of the cells with a given unique probability corresponding to the user and the cell, the paging from the cell to one of the users occurring within one of a plurality of time slots, the time slot in which one of the users is paged in one of the cells being a characteristic of the one cell and the one user, and, wherein, in one of said time slots, only one of the users is paged from one of the cells, the concurrent paging schedule obtained by the steps of:
A) selecting a pair of users, a first user and a second user, from the plurality of users;
B) selecting a pair of time slots, a first time slot and a second time slot, from the plurality of time slots;
C) determining, from the unique probability of any of the users being located in any of the cells, which of said first and said second users has a higher probability of being located in a pre-selected range from the plurality of cells;
D) if it is more probable that said first user be located in said pre-selected range, performing the following steps:
paging said first user from said first time slot in each cell from said pre-selected range;
paging said second user from said second time slot in each cell from said pre-selected range;
paging said first user from said second time slot in each cell from another pre-selected range of said plurality of cells; and,
paging said second user from said first time slot in each cell from said another pre-selected range;
E) if it is more probable that said second user be located in any cell from said pre-selected range, performing the following steps:
paging said first user from said second time slot in each cell from said pre-selected range;
paging said second user from said first time slot in each cell from said pre-selected range;
paging said first user from said first time slot in each cell from said another pre-selected range; and,
paging said second user from said second time slot in each cell from said another pre-selected range;
F) repeating steps A through E for a next pair of users and a next pair of time slots until all pairs of users are selected
whereby said concurrent paging schedule enables concurrent paging.

29. The concurrent paging schedule as in claim 28 obtained by the further steps of:

G) paging a last user from the plurality of users from a last time slot if a total number of users from the plurality of users is odd and a total number of time slots from the plurality of time slot is odd.

30. A concurrent paging schedule for concurrently paging, in a cellular system having a plurality of users, the users being paged to determine a location of each user, the paging to one of the plurality of users originating from one of a plurality of cells, any of the users being located in any of the cells with a given unique probability corresponding to the user and the cell, the paging from the cell to one of the users occurring within one of a plurality of time slots, the time slot in which one of the users is paged in one of the cells being a characteristic of the one cell and the one user, and, wherein, in one of said time slots, only one of the users is paged from one of the cells, the concurrent paging schedule obtained by the steps of:

A) obtaining a probability array having as initial value an array comprising a totality of the unique probabilities;
B) selecting an initial time slot from a plurality of time slots;
C) selecting, for each one cell from the plurality of cells, one user to be paged from the plurality of users;
D) paging the selected user in said each one cell;
E) determining from said paging whether the selected user has been located;
F) updating the probability array according to said paging;
G) proceeding to a next time slot from the plurality of time slots;
H) repeating the steps C through G unless a predetermined condition is satisfied, wherein said concurrent paging schedule comprises a two dimensional array of indices of a time slot in which one of the users is paged in one of the cells, which enables concurrent paging.

31. The paging schedule of claim 30 wherein a selection criterion, according to which a user is selected to paged in each cell, comprises selecting the user with maximum probability.

32. The paging schedule of claim 30 wherein said predetermined condition comprises said next time slot being a last time slot from the plurality of time slots or all users from the plurality of users being located.

* * * * *

UNITED STATES PATENT AND TRADEMARK OFFICE
CERTIFICATE OF CORRECTION

PATENT NO.        : 7,031,731 B2
APPLICATION NO. : 10/324224
DATED             : April 18, 2006
INVENTOR(S)       : Gau et al.

It is certified that error appears in the above-identified patent and that said Letters Patent is hereby corrected as shown below:

(column 14, line 40), "time slot" should read --time slots--;

(column 15, line 17), "selected to paged" should read --selected to be paged--;

(column 16, line 60), "time slot" should read --time slots--;

(column 18, line 5), "function, the an optimal" should read --function, an optimal--;

(column 19, lines 2-3), "two dimensional all of indices" should read --two dimensional array of indices";

(column 19, line 10), "time slot" should read --time slots--;

(column 19, line 49), "selected to paged" should read --selected to be paged--; and (column 21, line 4), "time slot" should read --time slots--.

Signed and Sealed this

First Day of August, 2006

JON W. DUDAS
*Director of the United States Patent and Trademark Office*